2 Sheets—Sheet 1.

B. S. BENSON.
STEAM-PLOW.

No. 171,595.  Patented Dec. 28, 1875.

WITNESSES:
W. W. Hollingsworth
Solon C. Kemon

INVENTOR:
B. S. Benson
BY
ATTORNEYS.

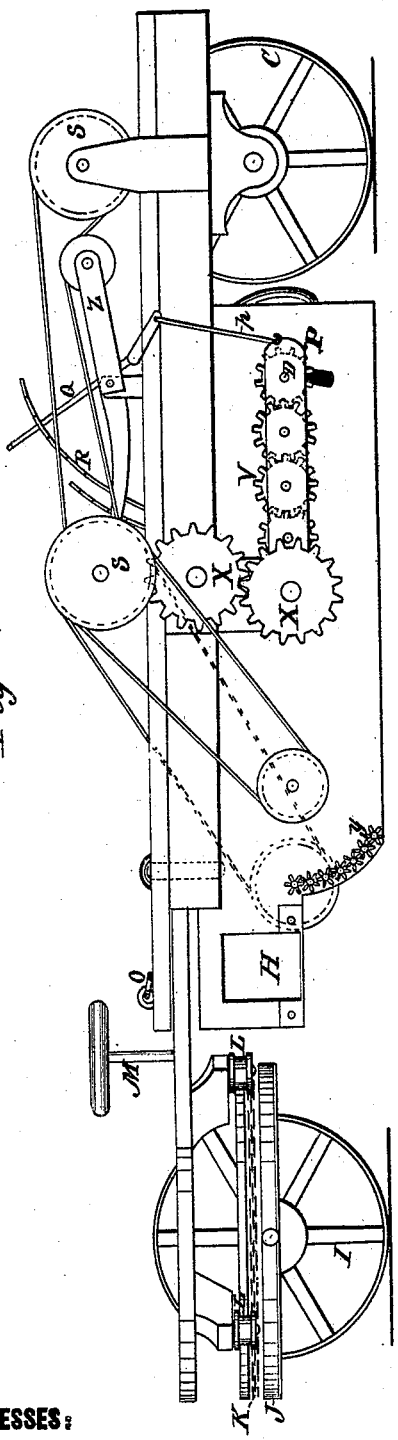

UNITED STATES PATENT OFFICE.

BENJAMIN S. BENSON, OF BALTIMORE, MARYLAND.

IMPROVEMENT IN STEAM-PLOWS.

Specification forming part of Letters Patent No. 171,595, dated December 28, 1875; application filed August 11, 1875.

*To all whom it may concern:*

Be it known that I, BENJAMIN S. BENSON, of Baltimore city, State of Maryland, have invented a new and Improved Steam-Plow; and I do hereby declare that the following is a full, clear, and exact description of the same, reference being had to the accompanying drawing, forming a part of this specification, in which—

Figure 1:
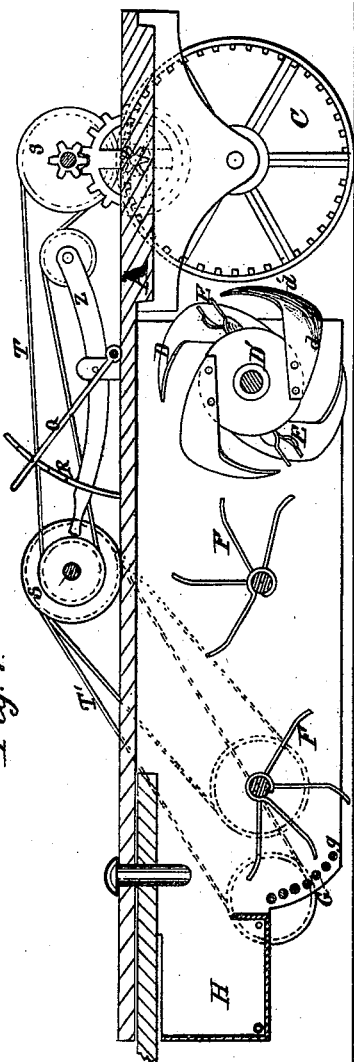
Figure 2:
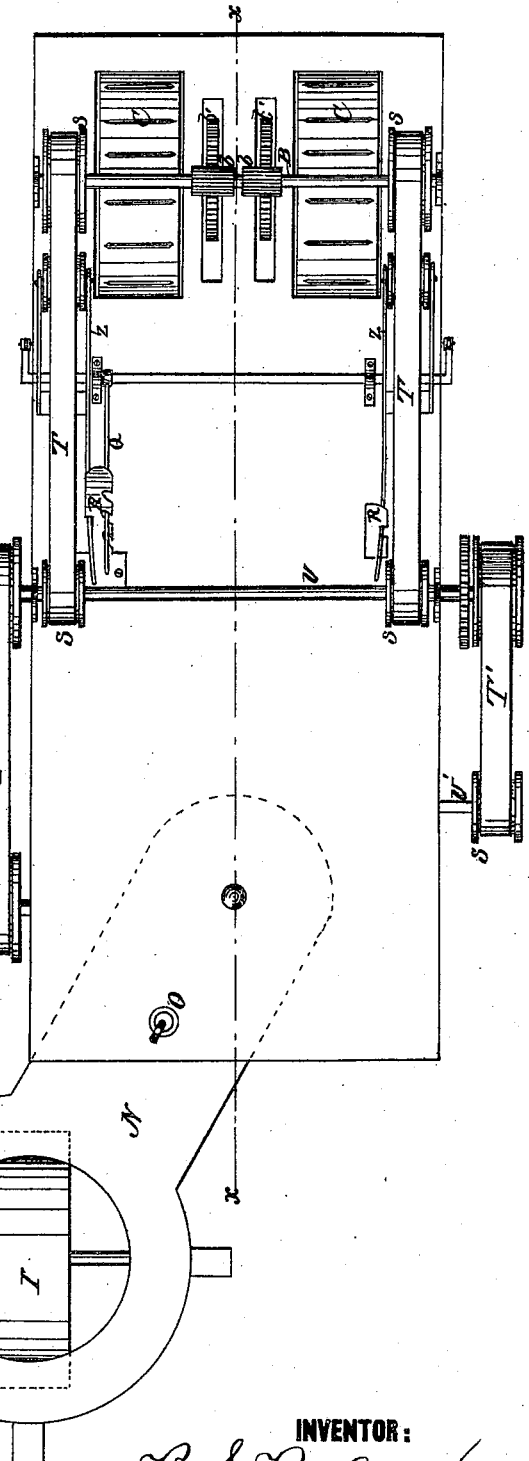

Figure 1 is a longitudinal vertical section; Fig. 2, a plan view; Fig. 3, a side elevation.

The invention contemplates the manufacture of a steam-plow which shall work with revolving blades to cut the earth, with fingers to separate it from the growth, with pickers to pulverize and shake the soil free as well as carry the whole to the rear, a sifter to allow the exit of the soil, and a box to receive the grass, weeds, and roots.

The features of invention will first be described in connection with drawing, and then pointed out in the claims.

A represents a three-wheeled truck, on which is placed an engine that actuates a drive-shaft, B, connected by slide-pinions $b$, spur-wheels $b^1$, shafts $b^2$, and pinion $b^3$, with the two independent drive-wheels C C spurred on the inside of their rims. D represents the rotary plows, which are of novel construction, arranged in pairs, each one of a pair being diametrically opposite the other. They cut in a vertical plane on the edge $d$, and are bent at or nearly at a right angle to form the bottom cutting-edge $d'$, which edge is not, however, in the same plane with the axis or center of motion, but at an oblique angle thereto, so as to excise the sod gradually, and with a shearing cut. As the knives revolve and lift the sod the latter is struck by the fingers E E, that are arranged behind each knife, and cause much of the dirt to be loosened and shaken out from the sod. The sod is then caught upon the revolving spirally-arranged pickers F, of which there may be two or more sets. These continue to separate the soil from the growth, and finally cast it into the concave rear sifter G, through which the remaining earth escapes, while the grass, weeds, and roots are transferred into the box H.

To enable the pickers thoroughly to perform this operation the bars $g$ are made to rotate. When so required, the box may be removed in order to scatter the grass and roots evenly over the surface of the plowed ground.

The box may be employed to carry the grass to convenient points where it is burned or emptied on the surface of ground to be killed by the sun.

I is a rear caster-wheel, journaled in a rotary pulley-ring, J, that is turned by a chain, K, pulleys L, and hand-shaft M to govern the direction of travel. In order to adjust the wheel I to suit the changing line of gravity on lands of different inclination the wheel-frame N is clamped detachably by a bolt, O. The plow-shaft D' is journaled in levers P P, which are connected by rods $p$ $p$ with hand-levers Q Q, that may be held in racks R R, so as to hold up the plows when traveling from field to field, or to graduate the depth at which they shall work.

By sliding one of the pinions $b$ out of contact with its spur-wheel, lifting the plows and moving the caster-wheel, the truck may be readily turned at the headlands.

The pulleys S S, belts T T' T' T', shafts U U', pinions V, spur-wheels X, and pinions Y, enable the plows and sifter-rods to be revolved. Belt-tighteners Z Z may also be employed to make or break the connection between drive-wheels and the plows as well as sifters.

By these features of improvement a comparatively inexpensive steam-plow is formed, one that is very efficient in use, and one that is not liable easily to get out of order.

Having thus described my invention, what I claim as new, is—

1. A rotary plow, D, having the rotary vertical sod-cutting edge $d$, and at right angles thereto a bottom-cutting edge, $d'$, oblique to the axis of motion, as shown and described.

2. The combination, with rotary plows, of fingers E E, arranged behind each plow, and on the same shaft, as and for the purpose set forth.

3. The combination, with rotary pickers F and receptacle H, of rotary bars $g$, arranged at intervals and in concave form behind the pickers and below the top of receptacle, as and for the purpose specified.

4. The wheel-frame N, laterally adjustable with respect to truck, as and for the purpose described.

BENJAMIN S. BENSON.

Witnesses:
LEVI TISCHMEYER,
J. C. BENSON.